United States Patent [19]

Le Forestier

[11] 3,915,421

[45] Oct. 28, 1975

[54] PNEUMATIC SUSPENSION

[76] Inventor: Rene Paul Le Forestier, 86 rue du General de Gaulle, 56300 Pontivy, France

[22] Filed: Mar. 28, 1974

[21] Appl. No.: 455,421

[30] Foreign Application Priority Data

Apr. 9, 1973 France .............................. 73.13343

[52] U.S. Cl. .......... 248/400; 297/DIG. 3; 267/65 A; 267/113
[51] Int. Cl.² .................... A47C 27/08; B60G 11/26
[58] Field of Search ........... 248/371, 372, 375, 378, 248/379, 380, 399–401; 267/131, 133, 113, 117–123; 297/DIG. 3

[56] References Cited
UNITED STATES PATENTS

| | | | |
|---|---|---|---|
| 1,880,181 | 9/1932 | Turner | 248/401 |
| 2,437,199 | 3/1948 | Kirk | 248/401 X |
| 2,916,081 | 12/1959 | Pinkel | 267/131 X |
| 2,930,607 | 3/1960 | Hutzenlaub | 267/65 A X |
| 3,095,987 | 7/1963 | Sable | 267/65 A X |
| 3,168,278 | 2/1965 | Odgen | 267/117 X |
| 3,227,470 | 1/1966 | Funk | 267/65 A X |
| 3,300,203 | 1/1967 | Carter et al. | 267/117 |

*Primary Examiner*—Roy D. Frazier
*Assistant Examiner*—Terrell P. Lewis
*Attorney, Agent, or Firm*—Laff, Whitesel & Rockman

[57] ABSTRACT

A pneumatic vehicle seat suspension system has a pair of spaced parallel horizontal plates attached to a seat and with an intermediate third plate attached to the floor placed between them. A first plurality of pneumatic bags are wedged between the first and third plates, and a second plurality of pneumatic bags are wedged between the third and second plates. Each bag of the first group is connected with one or more bags of the second group by one or more connecting passages for enabling a flow of the gaseous fluid between the bags.

7 Claims, 3 Drawing Figures

PNEUMATIC SUSPENSION

The present invention relates to a pneumatic suspension system and more particularly to a suspension system for a vehicle seat, as for an automobile or airplane, for example.

There is an urgent need to improve the means for suspending vehicle seats and especially for suspending seats subjected to significant vibrations or repeated shocks, such as trucks, agricultural tractors, construction machinery and aviation vehicles (especially helicopters). A shock absorbing system is important both to preserve the health and well being of vehicle operators and to provide for their comfort.

Previous solutions to this problem have made use of mechanical or hydraulic devices or of mixed hydraulic and/or pneumatic devices. For example, see generally the devices disclosed in French Pat. Nos. 1,596,251; 2,054,150; 2,055,300; 2,084,495; and 2,078,649. Some require hydraulic regulation system, and others require a mechanical spring, in addition to pneumatic elasticity. These hydraulic devices are obviously complicated and expensive. They pose liquid leakage problems. Moreover, they require a mechanical system capable of transmitting the forces sustained by the seat to a principal piston. All of these considerations increase the weight and complexity of the seat.

An object of the present invention is to provide an entirely pneumatic suspension which is simple and inexpensive.

In a French application, described as a request for a First Certificate of Addition, filed Dec. 7, 1970, French National Registration No. 70.43883, entitled "Seat For Vehicles", the applicant describes a pneumatic suspension device comprising two inflatable bags, one to serve as the seat itself and the other to control the flow of air between two bags which are connected together. It is noteworthy that this suspension is already an improvement over standard suspension systems. However, it does not adequately provide equal attention to all three parameters of a mechanical oscillating system. These three parameters are the suspended mass of the system, the suspension's elasticity, and the damping factor.

If one takes, for example, a seat suspension, it is apparent that the lower limit of the mass parameter includes the weight of the person seated on the seat, that can only be increased. This leaves little room for improvement because it is never advantageous to increase the weight of a vehicle's equipment. The elasticity parameter varies as a function of the pressure of the gaseous fluid inside the suspension system. The damping parameter can be made variable by creating a controlled leak.

An object of the present invention is to provide a pneumatic suspension seat having a characteristic response to vibrations which may be altered by varying its elasticity and damping parameters.

In keeping with one aspect of the invention, a pneumatic seat suspension system has a first horizontal plate designed to support the weight of the seat. A second horizontal plate is situated beneath and supported by the first plate by means of braces. A third and intermediate plate is situated between the first and second plates and attached to the chassis of the suspension, here the floor of a vehicle. A first group of primary pneumatic bags is wedged between the first and third plates and a second group of secondary pneumatic bags is wedged between the second and third plates. Each primary bag of the first group is linked with one or more of the secondary bags of the second group by means of one or more connecting passages. The flow through the passages is controllable by an appropriate means for constricting the cross-section thereof.

In keeping with another aspect of the invention, the length of various braces may be controlled to alter the maximum distance between the first and second plates, in order to vary the height of the first plate with respect to the third plate and/or the elasticity of the first and second groups of pneumatic bags.

According to another feature of the invention, the primary and secondary pneumatic bags are supplied with means of inflation, such as valves, so that their elasticity may be varied.

Following yet another feature of the invention, the braces are of the screw and nut type, formed with screws having stems which pass through the three plates. The heads of the screws are above the first plate with the threaded ends passing through the second plate, and the nuts on the stem being beneath the second plate. The stem passes through a hole in the third plate and has a diameter slightly greater than the diameter of the stem, to enable a slight horizontal movement of the first and second plates.

Other features of the invention will be more clearly apparent to the reader from the following description of an embodiment of the invention and the attached drawings, in which.

Figure 1:
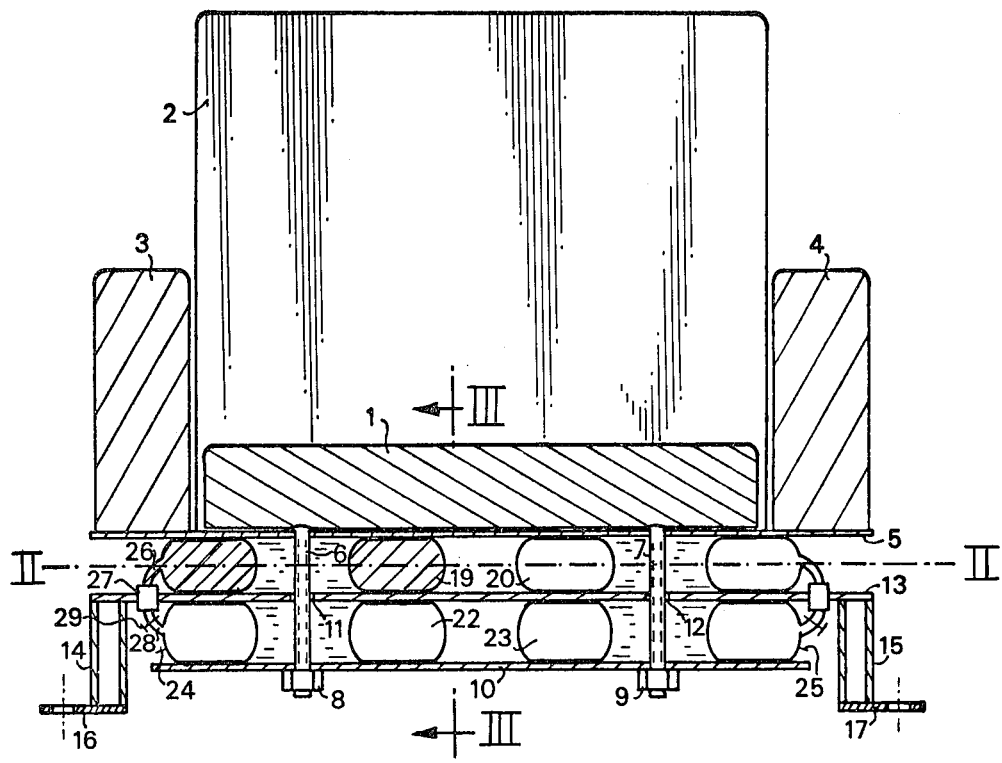
FIG. 1 is an elevated view of a seat suspension, according to the invention.

The suspension of FIG. 1 supports a seat formed of a cushion 1, a back 2 and armrests 3 and 4, which are firmly attached to a first horizontal plate 5. Through holes in plate 5 pass screws 6 and 7 to the lower end of which are screwed nuts 8 and 9 for supporting a second plate 10. Screws 6 and 7 also pass through holes 11 and 12 of a third plate 13. Plate 13 is firmly fixed to a support or chassis by means of girders 14, 15, and mounting arms 16, 17 and 18 (FIG. 2).

A first group of preferably toroidal primary pneumatic bags 19, 20 and 21 (FIG. 2) are placed between plates 5 and 13. A second group of similar secondary pneumatic bags 22 and 23 are placed between plates 13 and 10. (By way of easy identification the two sides of the toroid forming one bag 19 are cross hatched in FIG. 1). These bags may be somewhat similar to an automobile inner tube amd may be provided with valves, such as 24 and 25, for bags 22 and 23. Upper bag 19 is connected to lower bag 22 by a connecting passage comprising a tube end 26, and a flow control device 27, which can be seen in detail by referring to FIG. 3, and a tube end 28 furnished with a clamping clip 29. Bags 20 and 23 are connected by a similar communication passage.

Figure 2:
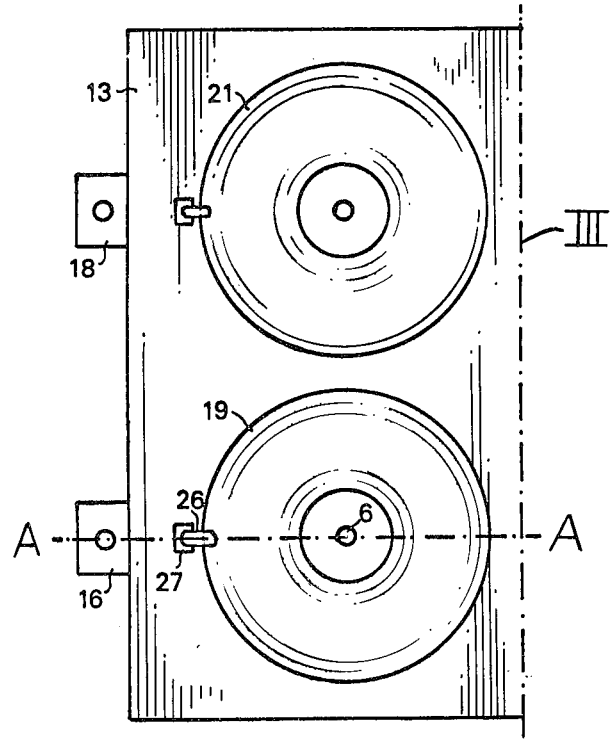
FIG. 2 is a horizontal view taken along line II—II of FIG. 1 and restricted to the left half of the suspension of FIG. 1 (as indicated by line III)

As shown by FIG. 2, the suspension, which is symmetrical about line A—A, comprises four pairs of superimposed bags, assuring a good distribution of force. A single pair of bags could be used if the resultant of the forces supported by plate 5 was always oriented in a vertical direction, passing through the center of plate 5. However, this is rarely the case, especially when the suspension is designed for a seat, and even more especially if plate 5 could take slanting positions, as when an airplane banks, so that a portion of the first bag would be more inflated or more flattened than the remaining portion. With several pairs of bags, one avoids this phenomenon.

The suspension system shown in FIGS. 1 and 2 enables an independent control of the parameters of mass, elasticity and damping of each bag. More particularly, the elasticity of the pressurized bags can easily be adjusted by means of valves such as 24 and 25. Damping can be adjusted by constricting clamps such as 29.

When the seat, that is, the ensemble 1, 2, 3, 4, oscillates with respect to the chassis (i.e., plate 13), the gaseous fluid is put into motion, flowing back and forth between bags 19 and 22 and bags 20 and 23. This flowing movement is restrained in the connecting passages, which restraint creates the damping of the oscillation. During a descending movement bag 19 stores energy by compression while bag 22 gives up energy by expansion. During an ascending movement the inverse phenomenon occurs. The bag pressure determines the stiffness of the seat.

By means of vibration experiments with the seat, one can compare the transmissibility curve of the invented seat as a function of frequency with the similar curve of standard seats or of other seats having existing damping devices. Transmissibility is the ratio of seat oscillation amplitude to chassis oscillation amplitude when the chassis is subjected to sustained oscillations. Generally, at 0 Hz the coefficient of transmissibility is equal to 1. Then, in a zone usually between 1 and 3 Hz, it increases, sometimes to a value greater than 2, before becoming less than 1 in the region beyond several Hz. Therefore, current seats have a very unsatisfactory zone in the region of the lowest frequencies.

It is well known that many vehicles, such as tractors and construction machinery, have chassis which are subjected to vibrations in a very low band of frequencies. By using the invented seat, with the elasticity and damping properly adjusted, it is possible to obtain a transmissibility curve which no longer has a peak and which decreases rapidly as oscillations move away from 0 Hz. This improved result has been obtained without requiring particularly precise adjustments, and for pneumatic bag pressures obtainable from manual inflation pumps, i.e. less than an atmosphere.

In the above description, it was assumed that the devices, such as 27, are not situated in the connecting passages or do not affect the flow of the gaseous fluid or air. Since it is desirable to make the suspension more comfortable, it would be helpful to provide such a damping device which produces different effects according to the direction of air flow.

Figure 3:
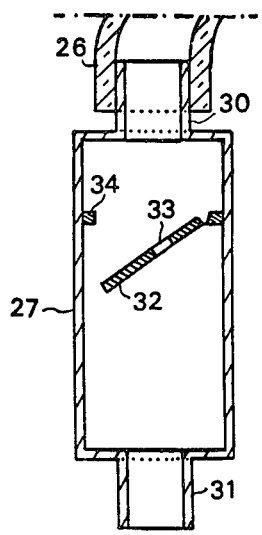
FIG. 3 is a cutaway or cross-section view of a device for enabling different damping actions according to the direction of flow of the gaseous fluid between the primary and secondary bags.

FIG. 3 shows an embodiment of the device 27, which is designed to damp the descent of the suspension less than the rise of the suspension. The device 27 includes an enclosure, preferably of rectangular cross-section, and provided with two nozzles 30 and 31. The nozzle 30 is connected to tube end 26 leading to bag 19, as shown by FIG. 3, and end 31 is similarly connected to bag 22. Inside the enclosure 27, a valve 32 is pierced by a hole 33. When the air or other fluid medium flows toward the bottom, the valve 32 is blown open and device 27 adds no damping to that provided by the clamping clip 29. However, when the air flows toward the top, valve 32 is blown shut to close against the housing stop 34. The more narrow diameter of the closed valve (i.e. the diameter of hole 33) causes additional damping. Enclosure 27 and the valve 32 may be made of plastic. The valve 32 may then be a part joined to the device 27 and clinging to the enclosure wall by means of a light groove thus providing a flexible area serving as the valve hinge.

It should be understood that the suspension of the invention can also be used to support any suitable apparatus, equipment or machines, instead of seats. The means used to make the suspension, plates, air chambers and braces, are easily and inexpensively purchased. The means for adjusting the suspension (i.e., valves 24 and 25 and nuts 8 and 9), may be in a location which is easy to reach, but also in positions where they cannot be inadvertently manipulated.

Although the principles of the present invention have been described above with respect to a particular embodiment of the invention, it should be understood that the description was made by way of illustration and does not limit the scope of the invention. Therefore, the appended claims are to be construed to cover all equivalent structure.

I claim:

1. A pneumatic suspension system comprising a first horizontal support plate, a second horizontal plate below and supported by the first plate, an intermediate third plate between the first and second plates, means for rigidly fastening the third plate to a rigid chassis, a first group of primary pneumatic bags containing a gaseous fluid between the first and third plates for resiliently supporting said first plate above said third plate and a second group of secondary pneumatic bags containing said gaseous fluid between the third and second plates, means for communicatingly interconnecting each primary bag of the first group and one or more secondary bags of the second group by one or more connecting passageways for enabling a transmission of said gaseous fluid, and means for controlling the flow of said gaseous fluid between the bags whereby the inflation levels of the various pneumatic bags are controllable.

2. The system of claim 1 wherein said flow control means comprises means for selectively constricting the cross-section of said passageways.

3. The system of claim 1 and selectively adjustable brace means extending between said first and second plates to provide support, the lengths of the braces being adjustable to fix maximum distance between the first and second plates and provide for a selection of the relative height of the first plate with respect to the third plate or to vary the elasticity of the first and second groups of pneumatic bags.

4. The system of claim 3, wherein each of the braces is a screw with a head, a stem, and a nut, the screw stem passing through all three plates, the head of the screw being above the first plate and the threaded end of the screw passing beneath the second plate, the nut being screwed on the threaded end beneath the second plate, a hole being formed in said third plate for enabling the stem to pass through the third plate, said hole having a diameter which is slightly greater than the diameter of the stem to enable a slight horizontal movement of the first and second plates with respect to the third plate.

5. The system of claim 1 and means for selectively inflating primary and secondary pneumatic bags in order to vary their elasticity.

6. The system of claim 1 in which the primary and secondary pneumatic bags are axially aligned toroidal tubes.

7. The system of claim 1 in which the means for controlling the flow of said gaseous fluid comprises constricting means has a greater cross-section for increasing the flow when the flow is toward the second plate as compared to the flow toward the first plate of the system.

* * * * *